United States Patent
Zhang et al.

(10) Patent No.: US 11,511,266 B2
(45) Date of Patent: Nov. 29, 2022

(54) CLUSTER COMPOUNDS CONTAINING [MN₃SRO₄] AND [MN₄SRO₄] CORE STRUCTURES, PREPARATION METHOD AND APPLICATION THEREOF

(71) Applicant: INSTITUTE OF CHEMISTRY, CHINESE ACADEMY OF SCIENCES, Beijing (CN)

(72) Inventors: Chunxi Zhang, Beijing (CN); Changhui Chen, Beijing (CN)

(73) Assignee: INSTITUTE OF CHEMISTRY, CHINESE ACADEMY OF SCIENCES, Beijing (CN)

( * ) Notice: Subject to any disclaimer, the term of this patent is extended or adjusted under 35 U.S.C. 154(b) by 210 days.

(21) Appl. No.: 16/761,204

(22) PCT Filed: Nov. 1, 2017

(86) PCT No.: PCT/CN2017/108928
§ 371 (c)(1),
(2) Date: May 1, 2020

(87) PCT Pub. No.: WO2019/084845
PCT Pub. Date: May 9, 2019

(65) Prior Publication Data
US 2020/0290031 A1    Sep. 17, 2020

(51) Int. Cl.
| | | |
|---|---|---|
| *B01J 31/22* | (2006.01) | |
| *C01B 13/02* | (2006.01) | |
| *B01J 37/03* | (2006.01) | |
| *B01J 37/12* | (2006.01) | |
| *B01J 37/10* | (2006.01) | |

(52) U.S. Cl.
CPC ......... *B01J 31/2226* (2013.01); *B01J 37/031* (2013.01); *B01J 37/10* (2013.01); *B01J 37/12* (2013.01); *C01B 13/0237* (2013.01); *B01J 2531/0211* (2013.01); *B01J 2531/24* (2013.01); *B01J 2531/72* (2013.01)

(58) Field of Classification Search
CPC ...... B01J 31/2226; B01J 37/031; B01J 37/10; B01J 37/12
See application file for complete search history.

(56) References Cited

FOREIGN PATENT DOCUMENTS

| CN | 104761591 A | 7/2015 | |
|---|---|---|---|
| WO | WO-2016124133 A1 * | 8/2016 | ............ B01J 31/22 |

OTHER PUBLICATIONS

Changhui Chen et al. A Synthetic Model for the Oxygen-evolving Complex in Sr2+-containing Photosystem II. Chem. Common. Apr. 25, 2014, vol. 50, pp. 9263-9265.

* cited by examiner

*Primary Examiner* — Yong L Chu
(74) *Attorney, Agent, or Firm* — Novick, Kim & Lee, PLLC; Allen Xue

(57) ABSTRACT

[Mn₃SrO₄] cluster compounds are synthesized in a single step from raw materials consisting of simple and inexpensive $Mn^{2+}$, $Sr^{2+}$ inorganic compounds and carboxylic acids by using permanganate anion as oxidant. This step can be followed by the synthesis of asymmetric biomimetic water splitting catalyst [Mn₄SrO₄] cluster compounds in the presence of water. The [Mn₄SrO₄] cluster compound can catalyze the splitting of water in the presence of an oxidant to release oxygen gas. The neutral [Mn₃SrO₄](R₁CO₂)₆(R₁CO₂H)₃ cluster compound can serve as precursors for the synthesis of biomimetic water splitting catalysts, and can be utilized in the synthesis of different types of biomimetic water splitting catalysts. [Mn₄SrO₄](R₁CO₂)₈(L₁)(L₂)(L₃)(L₄) cluster compounds can serve as artificial water splitting catalysts, can be utilized on the surface of an electrode or in the catalyzed splitting of water driven by an anoxidant.

17 Claims, 5 Drawing Sheets

CLUSTER COMPOUNDS CONTAINING [MN₃SRO₄] AND [MN₄SRO₄] CORE STRUCTURES, PREPARATION METHOD AND APPLICATION THEREOF

TECHNICAL FIELD

The present invention relates to a biomimetic water splitting catalyst containing manganese and strontium cluster compounds. Specifically, the present invention relates to two types of cluster compounds containing [Mn₃SrO₄] or [Mn₄SrO₄] core structures, preparation method and application thereof, wherein the [Mn₄SrO₄] cluster compounds can be directly used as artificial catalysts for catalyzing water splitting and [Mn₃SrO₄] cluster compounds can be used as precursors for the synthesis of biomimetic water splitting catalysts.

BACKGROUND ART

Energy crisis and environmental pollution are two key issues that constrain the sustained development of human society in the 21st century. If the inexhaustible solar energy can be used to split the abundant water on the earth, release oxygen, produce electrons and protons, and generate electricity or hydrogen energy, it can fundamentally solve the energy crisis and environmental pollution issues that humankind face. As water is thermodynamically very stable, it requires suitable catalysts to achieve an efficient and safe splitting. Recently, many international research teams have synthesized artificial catalysts having water-splitting function by using precious metals such as Ru and Ir and some complex ligands. However, the use of precious metals and complicated ligands makes the preparation of these catalysts cost highly and pollute environment easily, rendering the preparation method difficult to be popularized and applied. Therefore, it remains an unsolved scientific problem how to prepare an efficient, inexpensive and environmentally friendly water splitting catalyst.

The photosystem II of photosynthetic organisms is the only biological system in the natural world that can utilize inexpensive metal ions (Mn, Ca) efficiently and safely to achieve water splitting, produce electrons and protons, and release oxygen at the same time. The key reason why the photosystem II can split water efficiently and safely is that it has an unique [Mn₄Ca] cluster compound catalytic center. Recently, the high-resolution three-dimensional crystal structure of the photosystem II has revealed that the biological water splitting catalyst has an asymmetric [Mn₄CaOₙ] (n depends on the redox state of the catalyst and may be 4 or 5) heteronuclear metal cluster compound at the center, and six carboxyl groups, one imidazole ring and four water molecules at the periphery as ligands, in which the an asymmetric [Mn₄CaOₙ] heteronuclear metal cluster compound is formed by a [Mn₃CaO₄] cubic alkane and a Mn ion via an O²⁻ bridge.

The present inventor obtained a Chinese patent for invention CN 104761591B entitled "a water splitting catalyst containing a [Mn₄CaO₄] core structure, preparation method and application thereof" and filed on Feb. 6, 2015, which is incorporated herein by reference in its entirety. The patent protects the structural formula as shown below:

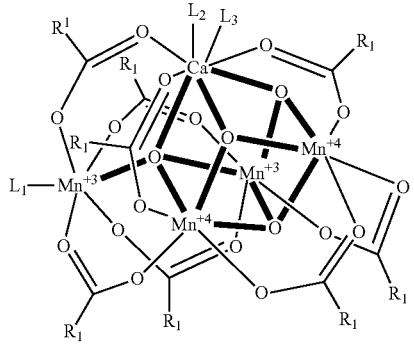

Formula 1 wherein, R₁ is selected from the group consisting of H and C₁₋₈ linear or branched alkyl; the three ligands L₁, L₂ and L₃ are the same or different and are each independently selected from the group consisting of carboxylic acid molecules and derivatives thereof, pyridine, imidazole, pyrazine, quinoline, isoquinoline and derivatives thereof, or water molecule, alcohol molecules, ketones, nitriles (such as acetonitrile), esters and other exchangeable neutral small molecules.

At present, how to chemically synthesize and prepare a biological water splitting catalytic center is not only an important scientific frontier but also a very challenging scientific problem. We have successfully prepared an artificial [Mn₄Ca] cluster compound which is similar to the biological water splitting catalytic center in structure and performance for the first time in the world. However, the cluster compound is sensitive to the environment, and especially the Ca²⁺ ion is easily to dissociate, leading to the loss of the catalytic performance of the artificial catalyst.

Biological studies have revealed that the calcium ions in the biological water splitting catalytic center can be replaced with strontium ions to generate [Mn₄Sr] cluster compounds. The [Mn₄Sr] cluster compounds are similar to biological [Mn₄Ca] cluster compounds in spatial structure and catalytic function but have obviously increased stability in terms of the water splitting catalytic center (F. H. M. Koua, Y. Umena, K. Kawakami and J. R. Shen, Proc. Natl. Acad. Sci. USA, 2013, 110, 3889-3894; A. Boussac, F. Rappaport, P. Carrier, J. M. Verbavatz, R. Gobin, D. Kirilovsky, A. W. Rutherford and M. Sugiura, J. Biol. Chem., 2004, 279, 22809-22819). During the water splitting process, the biocatalyst undergoes five different states (S₀, S₁, S₂, S₃, S₄). Among them, the four manganese ions in the dark steady state (State S₁) have valence states of +3, +3, +4 and +4. The revealation of the structure of the photosynthetic biological water splitting catalytic center provides an ideal blueprint for the development of an inexpensive, efficient, and environmentally friendly artificial water splitting catalyst.

SUMMARY OF THE INVENTION

The invention provides two new types of cluster compounds [Mn₃SrO₄] and [Mn₄SrO₄] and preparation methods thereof: a one-step synthesis by using inexpensive metal ions (Mn²⁺, Sr²⁺ ions), a simple organic carboxylic acid and MnO₄⁻ (as oxidant) as starting materials, to give a [Mn₃SrO₄] cluster compound containing [Mn₃SrO₄] cubic alkane. The [Mn₃SrO₄] cluster compound has six carboxyl anions and three neutral carboxylic acid molecules as ligands at the periphery, and all the three manganese ions have a valence state of +4. Such [Mn₃SrO₄] cluster compound that completely have carboxylic acids as ligands has not yet been reported, and the synthesis and separation thereof provides an important basis for the preparation of biomimetic [$Mn_4Sr$] catalysts. At the same time, the three +4 manganese ions in the [$Mn_3SrO_4$] cluster compound have unpaired electrons in a high spin state, which will endow the cluster compound with important application value in magnetic material.

Based on the synthesis of [$Mn_3SrO_4$] cluster compounds, we have successfully used inexpensive metal ions ($Mn^{2+}$, $Sr^{2+}$ ions), simple organic carboxylic acids, and $MnO_4^-$ as starting materials for the synthesis. Through a large number of experiments, we found that in the presence of water, the new cluster compounds could form a [$Mn_4SrO_4$] core in situ, and then reacted with pyridine to give a stable [$Mn_4SrO_4$] cluster compound biomimetic water splitting catalyst in two steps. In the new [$Mn_4SrO_4$] cluster compounds, an asymmetric [$Mn_4SrO_4$] core structure is formed by a [$Mn_3SrO_4$] cubic alkane and a Mn ion via an $O^{2-}$ bridge. The [$Mn_4SrO_4$] has peripheral ligands consisted of eight carboxyl anions and four exchangeable neutral ligands. The four manganese ions have valence states of +3, +3, +4 and +4, respectively. This new type of cluster compound is not only very similar to the biological [$Mn_4Sr$] water splitting catalytic center, but also similar to the [$Mn_4Ca$] cluster compounds in structure and performance as synthesized by the inventor in an early stage. The previous synthesis of [$Mn_4Ca$] cluster compounds did not require the presence of water, because the addition of water will cause the synthesis reaction to fail. Nevertheless, the synthesis of [$Mn_4Sr$] cluster compounds of the present invention requires the presence of water, and otherwise the reaction will produce completely different compounds (C. Chen, C. Zhang, H. Dong and J. Zhao, Chem. Commun., 2014, 50, 9263-9265). By Comparing [$Mn_4SrO_4$] cluster compounds with [$Mn_4CaO_4$] cluster compounds, the introduction of $Sr^{2+}$ ion significantly increases the stability of the cluster compounds, and the three neutral ligands on $Sr^{2+}$ ion (only two neutral ligands on $Ca^{2+}$ ion) makes the [$Mn_4SrO_4$] cluster compounds more suitable to be modified into different types of artificial water splitting catalysts and thus more likely to meet the needs of practical applications in the future. The [$Mn_4SrO_4$] cluster compounds can catalyze the splitting reaction of water and release oxygen in the presence of an oxidant. Such cluster compounds and the derivatives thereof obtained by structural modification can be used as artificial catalysts for biomimetic water splitting.

One object of the present invention is to provide a cluster compound containing [$Mn_3SrO_4$] and [$Mn_4SrO_4$] core structures, and a preparation method and application thereof.

Another object of the present invention is to provide a biomimetic water splitting catalyst containing a [$Mn_4SrO_4$] core structure, and a preparation method and application thereof.

A third object of the present invention is to provide a complex, and a preparation method and application thereof.

The objects of the invention can be realized through the following technical solutions:

(1) A [$Mn_3SrO_4$]($R_1CO_2$)$_6$($R_1CO_2H$)$_3$ compound represented by Formula I, characterized in that the compound comprises three Mn ions and one $Sr^{2+}$ ion linked via four $O^{2-}$ ions to form a [$Mn_3SrO_4$] heteronuclear metal cluster skeleton core;

the [$Mn_3SrO_4$] cluster compound has six carboxylate anions ($R_1CO_2^-$) and three neutral carboxylic acid ligands ($R_1CO_2H$) as the peripheral ligands; the three Mn ions all have a valence state of +4, and the whole cluster compound is electrically neutral;

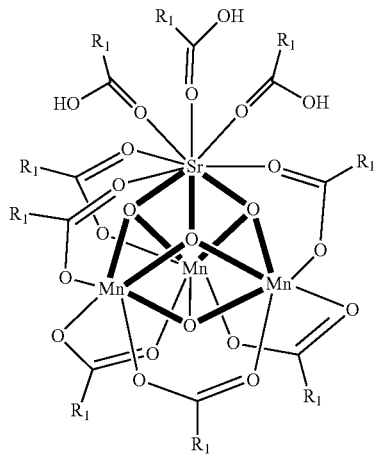

Formula I wherein, $R_1$ is selected from the group consisting of H and $C_{1-8}$ linear or branched alkyl.

According to a preferred embodiment of the present invention, the carboxylate anion ($R_1CO_2^-$) may be the anion of a carboxylic acid such as formic acid, acetic acid, propionic acid, butyric acid, isobutyric acid, valeric acid, isovaleric acid, pivalic acid and hexanoic acid. That is, $R_1$ may be hydrogen (H), methyl (—$CH_3$), ethyl (—$C_2H_5$), n-propyl (—$CH_2CH_2CH_3$), isopropyl (—$CH(CH_3)_2$), n-butyl (—$(CH_2)_3CH_3$), isobutyl (—$CH(CH_3)C_2H_5$), tert-butyl (—$C(CH_3)_3$), n-pentyl (—$(CH_2)_4CH_3$), isopentyl (—$CH_2CH_2CH(CH_3)_2$), and the like.

Particularly preferably, the compound of Formula I is selected from the group consisting of:

compound 1, [$Mn_3SrO_4$]($R_1CO_2$)$_6$($R_1CO_2H$)$_3$, wherein $R_1$=tert-butyl.

Preferably, compound 1 is a single crystal. The single crystal is a trigonal system with space group of R-3c, cell parameters of a=10.6575(15) Å, b=10.6575(15) Å, c=87.917(18) Å, α=90.00°, β=90.00°, and γ=120.00°, Z=6, and volume of 8648(3) Å$^3$. Compound 1 has the structure as shown in the following Formula I-1:

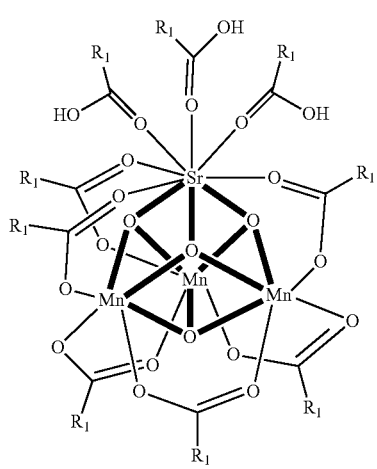

Formula I-1 wherein $R_1$ is tert-butyl;

(2) A [$Mn_4SrO_4$]($R_1CO_2$)$_8$($L_1$)($L_2$)($L_3$)($L_4$) compound represented by Formula II, characterized in that the compound comprises four Mn ions and one $Sr^{2+}$ ion linked via four $O^{2-}$ ions to form an asymmetric $[Mn_4SrO_4]$ heteronuclear metal cluster skeleton core;

the $[Mn_4SrO_4]$ cluster compound has eight carboxylate anions $(R_1CO_2^-)$ and four neutral ligands $(L_1, L_2, L_3, L_4)$ as the peripheral ligands; the four Mn ions have valence states of +3, +3, +4 and +4, respectively, and the whole cluster compound is electrically neutral;

Formula II

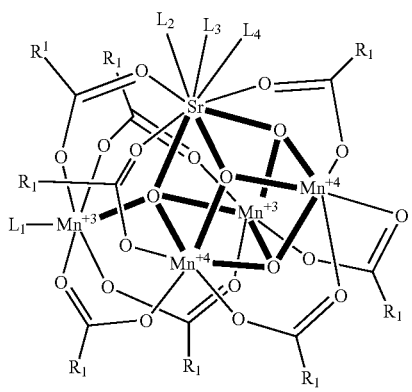

wherein, $R_1$ is selected from the group consisting of H and $C_{1-8}$ linear or branched alkyl;

the four ligands $L_1$, $L_2$, $L_3$ and $L_4$ are the same or different and are each independently selected from the group consisting of carboxylic acid molecules and derivatives thereof, pyridine, imidazole, pyrazine, quinoline, isoquinoline, bipyridine and derivatives thereof, or water molecule, alcohol molecules, ketones, nitriles (such as acetonitrile), esters and other exchangeable neutral small molecules.

According to a preferred embodiment of the present invention, the carboxylate anion $(R_1CO_2^-)$ may be the anion of a carboxylic acid such as formic acid, acetic acid, propionic acid, butyric acid, isobutyric acid, valeric acid, isovaleric acid, pivalic acid and hexanoic acid. That is, $R_1$ may be hydrogen (H), methyl (—$CH_3$), ethyl (—$C_2H_5$), n-propyl (—$CH_2CH_2CH_3$), isopropyl (—$CH(CH_3)_2$), n-butyl (—$(CH_2)_3CH_3$), isobutyl (—$CH(CH_3)C_2H_5$), tert-butyl (—$C(CH_3)_3$), n-pentyl (—$(CH_2)_4CH_3$), isopentyl (—$CH_2CH_2CH(CH_3)_2$), and the like.

Particularly preferably, the compound of Formula II is selected from the group consisting of:

$[Mn_4SrO_4](R_1CO_2)_8(L_1)(L_2)(L_3)(L_4)$, wherein $R_1$=tert-butyl, $L_1$=pyridine, and $L_2$=$L_3$=$L_4$=pivalic acid.

Most preferably, the compound of Formula II is selected from the following compounds:

compound 2, $[Mn_4SrO_4](R_1CO_2)_8(L_1)(L_2)(L_3)(L_4)$, wherein $R_1$=tert-butyl, $L_1$=pyridine, and $L_2$=$L_3$=$L_4$=pivalic acid (or 2,2-dimethylpropionic acid, or trimethyl acetic acid, corresponding to $R_1$COOH, wherein $R_1$ is tert-butyl).

Preferably, compound 2 is a single crystal. The single crystal is an orthogonal system with space group of Pna21, cell parameters of a=19.059(3) Å, b=23.711(4) Å, c=19.416(4) Å, α=90.00°, β=90.00°, and γ=90.00°, Z=4, and volume of 8774(3) Å³. Compound 2 has the structure as shown in the following Formula II-1:

Formula II-1

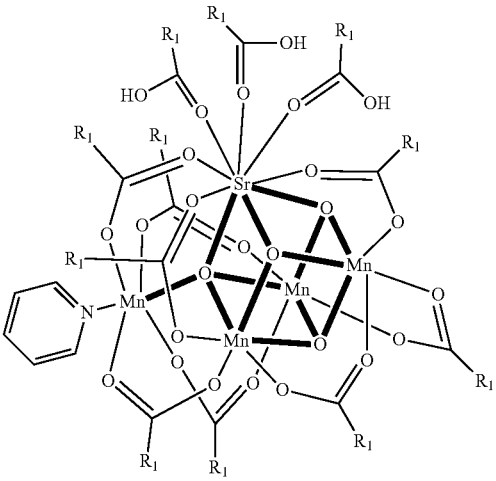

wherein $R_1$ is tert-butyl;

(3) The invention also provides a complex, characterized in that the complex is formed by the combination of two or more compounds of Formula II:

Formula II

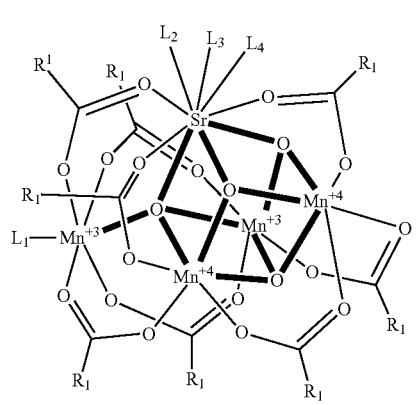

wherein each substituent is defined as shown in Formula II.

Most preferably, the complex is selected from the following ones:

$[[Mn_4SrO_4](R_1CO_2)_8(L_1)(L_2)(L_3)(L_4)]\cdot[[Mn_4SrO_4](R_1CO_2)_8(L_1)(L_2)(L_3)(L_4^*)]$, wherein $R_1$=tert-butyl, $L_1$=pyridine, $L_2$=$L_3$=$L_4$=pivalic acid, and $L_4^*$=ethyl acetate;

$[[Mn_4SrO_4](R_1CO_2)_8(L_1)(L_2)(L_3)(L_4)]\cdot[[Mn_4SrO_4](R_1CO_2)_8(L_1)(L_2)(L_3)(L_4^*)]$, wherein $R_1$=tert-butyl, $L_1$=isoquinoline, $L_2$=$L_3$=$L_4$=pivalic acid, and $L_4^*$=ethyl acetate.

Most preferably, the complex is selected from any of the following ones:

complex 3, $[[Mn_4SrO_4](R_1CO_2)_8(L_1)(L_2)(L_3)(L_4)]\cdot[[Mn_4SrO_4](R_1CO_2)_8(L_1)(L_2)(L_3)(L_4^*)]$, wherein $R_1$=tert-butyl, $L_1$=pyridine, $L_2$=$L_3$=$L_4$=pivalic acid, and $L_4^*$=ethyl acetate.

Preferably, complex 3 is a single crystal. The single crystal is a monoclinic system with space group of P1 $2_1$/c1, cell parameters of a=29.9019(5) Å, b=18.9368(3) Å, c=30.1980(4) Å, α=90.00°, β=92.6590(10)°, and γ=90.00°, Z=4, and volume of 17081.1(5) Å³. The [[Mn₄SrO₄](R₁CO₂)₈(L₁)(L₂)(L₃)(L₄)] part of the structure of complex 3 is shown in Formula II-1, and the [[Mn₄SrO₄](R₁CO₂)₈(L₁)(L₂)(L₃)(L₄*)] part is shown in the following Formula 11-2:

Formula II-2

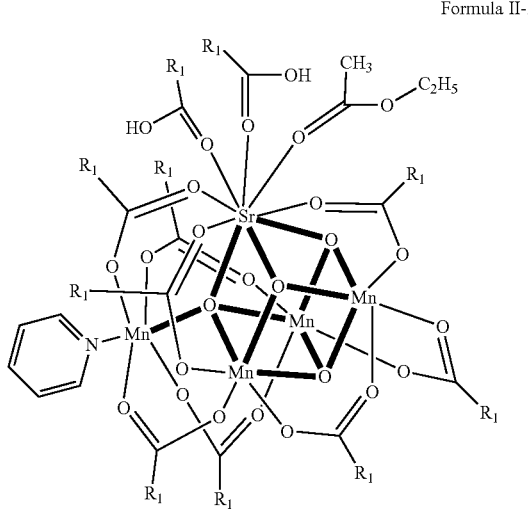

wherein R₁ is tert-butyl;

complex 4, [[Mn₄SrO₄](R₁CO₂)₈(L₁)(L₂)(L₃)(L₄)].[[Mn₄SrO₄](R₁CO₂)₈(L₁)(L₂)(L₃)(L₄*)], wherein R₁=tert-butyl, L₁=isoquinoline, L₂=L₃=L₄=pivalic acid, and L₄*=ethyl acetate.

Preferably, complex 4 is a single crystal. The single crystal is a triclinic system with space group of P-1, cell parameters of a=14.676(2) Å, b=25.313(3) Å, c=25.601(4) Å, α=76.547(5)°, β=87.559(6)°, and γ=73.153(6)°, Z=2, and volume of 8850(2) Å³. The [[Mn₄SrO₄](R₁CO₂)₈(L₁)(L₂)(L₃)(L₄)] part of the structure of complex 4 is shown in Formula II-3-1, and the [[Mn₄SrO₄](R₁CO₂)₈(L₁)(L₂)(L₃)(L₄*)] part is shown in the following Formula II-3-2:

Formula II-3-1

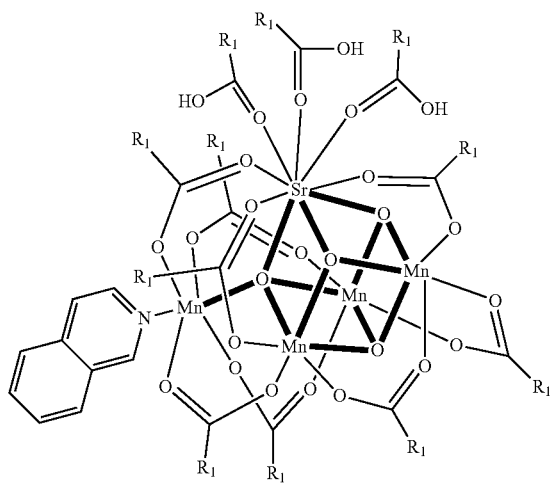

wherein R₁ is tert-butyl;

Formula II-3-2

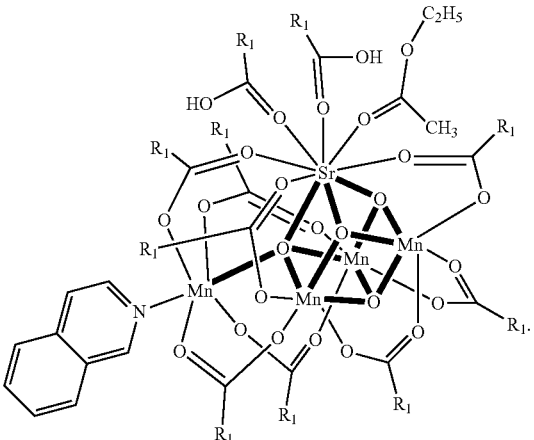

wherein R₁ is tert-butyl;

(4) A method for preparing the [Mn₃SrO₄](R₁CO₂)₆(R₁CO₂H)₃ compound represented by Formula I, characterized in that the method comprises the following steps:

A solution of an acid (preferably an organic carboxylic acid), an oxidant, Mn²⁺ salts and a Sr²⁺ salt in a molar ratio of x:y:1:1 (x=10-120, y=1-10, preferably x=20-100, y=2-8) in acetonitrile, is heated and reacted for 10-60 minutes to give a solution; the precipitate is removed off by filtration; and the filtrate is allowed to stand still for 1-6 days to give crystals.

According to the present invention, the reagents used are as follows: the divalent manganese salt, i.e., Mn²⁺ salt, may be selected from various carboxylates containing Mn²⁺, wherein the carboxylate anion (R₁CO₂⁻) is as described above, or may be such as formate, acetate, propionate, butyrate, isobutyrate, valerate, isovalerate, pivalate, hexanoate and other carboxylate radicals as well as derivatives thereof (preferably acetate, pivalate). The divalent manganese salt may also be Mn(ClO₄)₂, MnCl₂, MnSO₄, Mn(NO₃)₂, Mn(CF₃SO₃)₂ or other divalent manganese salts. These salts may be the derivatives containing different numbers of crystal water molecules per formula unit of the carboxylic acid salt (the number of the crystal water n is 0-6, preferably 1-5 or 2-4).

The Sr²⁺ salt may be selected from various carboxylates of strontium, wherein the carboxylate anion (R₁CO₂⁻) is as described above, or may be such as formate, acetate, propionate, butyrate, isobutyrate, valerate, isovalerate, pivalate, hexanoate and other carboxylate radicals as well as derivatives thereof (preferably acetate, pivalate). The Sr²⁺ salt may also be Sr(ClO₄)₂, Sr(NO₃)₂, Sr(CF₃SO₃)₂ or other strontium salts. These salts may be the derivatives containing different numbers of crystal water molecules per formula unit of the carboxylic acid salt (the number of crystal water n is 0-6, preferably 1-5 or 2-4).

The oxidant is preferably permanganate anionic oxidant, more preferably tetrabutylammonium permanganate ((C₄H₉)₄N.MnO₄).

The acid is preferably an organic carboxylic acid, such as formic acid, acetic acid, propionic acid, butyric acid, isobutyric acid, valeric acid, isovaleric acid, pivalic acid, hexanoic acid and other carboxylic acids and derivatives thereof (preferably isobutyric acid, pivalic acid).

The acetonitrile solvent is used at a volume of about 60-100 mL acetonitrile per mmol strontium salt.

The inventors have found that the above reaction can only be carried out in acetonitrile solvent, because the target compound cannot be obtained in either alcohol or other organic solvents.

According to the present invention, the reaction temperature is 60 to 90° C., for example, may be 70 to 80° C.

According to the present invention, the reaction time may be 10 to 60 minutes, for example, 20 to 50 minutes.

(5) The present invention also provides use of the $[Mn_3SrO_4](R_1CO_2)_6(R_1CO_2H)_3$ compound of Formula I as a precursor for the synthesis of a biomimetic $[Mn_4SrO_4]$ water splitting catalyst.

Preferably, the compound of Formula I according to the present invention, which is a $[Mn_3SrO_4]$ cluster compound, is converted into a $[Mn_4SrO_4]$ cluster compound in the presence of water in situ.

Preferably, the compound of Formula I according to the present invention, which is a $[Mn_3SrO_4]$ cluster compound, is converted into a $[Mn_4SrO_4]$ cluster compound in the presence of water in situ, and the $[Mn_4SrO_4]$ cluster compound catalyzes the oxygen-releasing reaction.

According to a preferred technical solution of the present invention, compound 1 of the present invention has a molecular formula of $C_{45}H_{84}Mn_3O_{22}Sr$, and a structure of $[Mn_3SrO_4](R_1CO_2)_6(R_1CO_2H)_3$, wherein $R_1$=tert-butyl.

Compound 1 is a single crystal. The single crystal is a trigonal system with space group of R-3c, cell parameters of a=10.6575(15) Å, b=10.6575(15) Å, c=87.917(18) Å, α=90.00°, β=90.00°, and γ=120.00°, Z=6, and volume of 8648(3) Å$^3$. The structure is shown in Formula I. The crystal structure is shown in FIG. 1, and the single crystal parameters are shown in Table 1.

TABLE 1

Single crystal parameters of compound 1

| | |
|---|---|
| Molecular formula | $C_{45}H_{84}Mn_3O_{22}Sr$ |
| Molecular weight (g/mol) | 1229.56 |
| Temperature (K) | 173.15 |
| Wavelength (Å) | 0.71073 |
| Crystal system | trigonal |
| Space group | R-3c |
| Cell parameters | a = 10.6575(15) (Å) |
| | b = 10.6575(15) (Å) |
| | c = 87.917(18) (Å) |
| | α = 90.00 (°) |
| | β = 90.00 (°) |
| | γ = 120.00 (°) |
| Volume V (Å$^3$) | 8648(3) |
| Number of molecules in one unit cell | 6 |
| Calculated density Dc (g/cm$^3$) | 1.417 |
| Absorption coefficient (mm$^{-1}$) | 1.634 |
| Single crystal size | 0.780 × 0.390 × 0.055 mm |
| F(000) | 3858 |
| range of θ | 2.780—27.476 ° |
| Number of data collected | 17196 |
| Number of independent data | 2210 [R(int) = 0.0874] |
| Final R factor [I > 2σ(I)] | $R_1$ = 0.0622 |
| | $wR_2$ = 0.1559 |
| R factor of all data | $R_1$ = 0.0636 |
| | $wR_2$ = 0.1571 |
| Maximum and minimum electron diffraction densities | 0.473 and −0.636 e · Å$^{-3}$ |

(6) A method for preparing a $[Mn_4SrO_4](R_1CO_2)_8(L_1)(L_2)(L_3)(L_4)$ compound represented by Formula II, characterized in that the method comprises the following steps:

Step 1: A solution of an acid (preferably an organic carboxylic acid), an oxidant, Mn$^{2+}$ salts, a Sr$^{2+}$ salt and water in a molar ratio of x:y:1:1:z (x=10-120, y=1-10, z=0-20; preferably x=20-100, y=2-8, z=0-10) in acetonitrile is heated and reacted for 10-60 minutes to give a solution; the precipitate is removed off by filtration; and the filtrate is crystallized to give crystals, and is preferably crystallized at 0° C. to give crystals;

Step 2: the crystals obtained in step 1 are dissolved in an ester solvent, and then organic ligands $L_1$, $L_2$, $L_3$ and $L_4$ are added; and the product is obtained after crystallization.

According to the above method, the product obtained in Step 2 may be subject to further process (for example, recrystallization) with an alkane, a cycloalkane or a halogenated hydrocarbon to give the final product.

According to the present invention, the reagents used are as follows: the divalent manganese salt may be selected from various carboxylates containing Mn$^{2+}$, wherein the carboxylate anion ($R_1CO_2^-$) is as described above, or may be such as formate, acetate, propionate, butyrate, isobutyrate, valerate, isovalerate, pivalate, hexanoate and other carboxylate radicals as well as derivatives thereof (preferably acetate, pivalate). The divalent manganese salt may also be $Mn(ClO_4)_2$, $MnCl_2$, $MnSO_4$, $Mn(NO_3)_2$, $Mn(CF_3SO_3)_2$ or other divalent manganese salts. These salts may be the derivatives containing different numbers of crystal water molecules (the number of the crystal water n contains 0-6, preferably 1-5 or 2-4 per formula unit of the carboxylic acid salt).

Sr$^{2+}$ salt may be selected from various carboxylates of strontium, wherein the carboxylate anion ($R_1CO_2^-$) is as described above, or may be such as formate, acetate, propionate, butyrate, isobutyrate, valerate, isovalerate, pivalate, hexanoate and other carboxylate radicals as well as derivatives thereof (preferably acetate, pivalate). The strontium salt may also be $Sr(ClO_4)_2$, $Sr(NO_3)_2$, $Sr(CF_3SO_3)_2$ or other strontium salts. These salts may be the derivatives containing different numbers of crystal water molecules per formula unit of the carboxylic acid salt (the number of crystal water n is 0-6, preferably 1-5 or 2-4).

The oxidant is preferably permanganate anionic oxidant, more preferably tetrabutylammonium permanganate (($C_4H_9)_4N.MnO_4$).

The acid is preferably an organic carboxylic acid, such as formic acid, acetic acid, propionic acid, butyric acid, isobutyric acid, valeric acid, isovaleric acid, pivalic acid, hexanoic acid and other carboxylic acids and derivatives thereof (preferably acetic acid, pivalic acid).

The acetonitrile solvent in Step 1 is used at a volume of about 60-100 mL acetonitrile per mmol strontium salt. This reaction can only be carried out in acetonitrile solvent, because the target compound cannot be obtained in either alcohol or other organic solvents.

According to the present invention, the ester organic solvent used in the reaction of Step 2 may be an ester such as ethyl acetate, methyl acetate, or propyl propionate. The organic solvent used for the recrystallization of the product may be linear or branched alkanes and halogenated hydrocarbons and derivatives thereof such as n-hexane, isooctane, dichloroethane, and dichloromethane.

The organic ligands may be the same or different and are each independently selected from the group consisting of carboxylic acid molecules and derivatives thereof, pyridine, imidazole, pyrazine, bipyridine, isoquinoline and derivatives thereof, or water molecule, alcohol molecules, ketones, nitriles (such as acetonitrile), esters and other exchangeable neutral small molecules.

According to the present invention, the reaction temperature is 60 to 90° C., for example, may be 70 to 80° C.

According to the present invention, the reaction time may be 10 to 60 minutes, for example, 20 to 50 minutes.

(7) The present invention also provides a method for preparing the above-mentioned complex, characterized in that the method comprises the following steps:

Step 1: A solution of an acid (preferably an organic carboxylic acid), an oxidant, $Mn^{2+}$ salts, a $Sr^{2+}$ salt and water in a molar ratio of x:y:1:1:z (x=10-120, y=1-10, z=0-20; preferably x=20-100, y=2-8, z=0-10) in acetonitrile is heated and reacted for 10-60 minutes to give a solution; the precipitate is removed off by filtration; and the filtrate is crystallized to give crystals, and is preferably crystallized at 0° C. to give crystals;

Step 2: the crystals obtained in Step 1 are dissolved in a ester solvent, and organic ligands $L_1$, $L_2$, $L_3$ and $L_4$ are added; and a crude product is obtained after crystallization;

Step 3: optionally, the product obtained in Step 2 is subject to further process (such as rinsing or recrystallization with an alkane, a cycloalkane or a halogenated hydrocarbon) to give the final product. Preferably, the product is dissolved in an ester solvent before further processing.

According to the present invention, the reagents used are as follows: the divalent manganese salt may be selected from various carboxylates containing $Mn^{2+}$, wherein the carboxylate anion ($R_1CO_2^-$) is as described above, or may be such as formate, acetate, propionate, butyrate, isobutyrate, valerate, isovalerate, pivalate, hexanoate and other carboxylate radicals as well as derivatives thereof (preferably acetate, pivalate). The divalent manganese salt may also be $Mn(ClO_4)_2$, $MnCl_2$, $MnSO_4$, $Mn(NO_3)_2$, $Mn(CF_3SO_3)_2$ or other divalent manganese salts. These salts may be the derivatives containing different numbers of crystal water molecules (the number of the crystal water n contains 0-6, preferably 1-5 or 2-4 per formula unit of the carboxylic acid salt).

The $Sr^{2+}$ salt may be selected from various carboxylates of strontium, wherein the carboxylate anion ($R_1CO_2^-$) is as described above, or may be such as formate, acetate, propionate, butyrate, isobutyrate, valerate, isovalerate, pivalate, hexanoate and other carboxylate radicals as well as derivatives thereof (preferably acetate, pivalate). The strontium salt may also such as $Sr(ClO_4)_2$, $Sr(NO_3)_2$, $Sr(CF_3SO_3)_2$ or other strontium salts. These salts may be the derivatives containing different numbers of crystal water molecules per formula unit of the carboxylic acid salt). (the number of crystal water n is 0-6, preferably 1-5 or 2-4).

The oxidant is preferably permanganate anionic oxidant, more preferably tetrabutylammonium permanganate (($C_4H_9)_4N \cdot MnO_4$).

The acid is preferably an organic carboxylic acid, such as formic acid, acetic acid, propionic acid, butyric acid, isobutyric acid, valeric acid, isovaleric acid, pivalic acid, hexanoic acid and other carboxylic acids and derivatives thereof (preferably acetic acid, pivalic acid).

The acetonitrile solvent in Step 1 is used at a volume of about 60-100 mL acetonitrile per mmol strontium salt. This reaction can only be carried out in acetonitrile solvent, because the target compound cannot be obtained in either alcohol or other organic solvents.

According to the present invention, the ester organic solvent used in the reaction of Step 2 may be an ester such as ethyl acetate, methyl acetate, or propyl propionate. The organic solvent used for the recrystallization of the product may be linear or branched alkanes and halogenated hydrocarbons and derivatives thereof such as n-hexane, isooctane, dichloroethane, and dichloromethane.

The organic ligands may be the same or different and are each independently selected from the group consisting of carboxylic acid molecules and derivatives thereof, pyridine, imidazole, pyrazine, bipyridine, isoquinoline and derivatives thereof, or water molecule, alcohol molecules, ketones, nitriles (such as acetonitrile), esters and other exchangeable neutral small molecules.

According to the present invention, the reaction temperature is 60 to 90° C., for example, may be 70 to 80° C.

According to the present invention, the reaction time may be 10 to 60 minutes, for example, 20 to 50 minutes.

(8) The invention also provides use of the compound of Formula II as a biomimetic water splitting catalyst.

Preferably, the compound of Formula II is used to drive the catalytic splitting of water in the presence of an oxidant (which may be a stable oxidant or a photoinduced transient oxidant) to release oxygen.

(9) The invention also provides use of the above complex as a biomimetic water splitting catalyst.

Preferably, the complex is used to drive the catalytic splitting of water in the presence of an oxidant (which may be a stable oxidant or a photoinduced transient oxidant) to release oxygen.

(10) The present invention also provides a water splitting catalyst, characterized in that the catalyst comprises a $[Mn_4SrO_4](R_1CO_2)_8(L_1)(L_2)(L_3)(L_4)$ compound of the present invention as described above, wherein the definition of each substituent is as described above; and/or, the catalyst comprises the above complex, wherein the definition of each substituent is as described above.

According to the present invention, compound 2 of the present invention has molecular formula of $C_{60}H_{107}Mn_4NO_{26}Sr$, and a structure of $[Mn_4SrO_4](R_1CO_2)_8(L_1)(L_2)(L_3)(L_4)$, wherein $R_1$=tert-butyl, $L_1$=pyridine, and $L_2=L_3=L_4$=pivalic acid.

Compound 2 is a single crystal. The single crystal is an orthogonal system with space group of $Pna2_1$, cell parameters of a=19.059(3) Å, b=23.711(4) Å, c=19.416(4) Å, α=90.00°, β=90.00°, and γ=90.00°, Z=4, and volume of 8774(3) Å³. The crystal structure is shown in FIG. 2, and the single crystal parameters are shown in Table 2.

TABLE 2

| Single crystal parameters of compound 2 | |
| --- | --- |
| Molecular formula | $C_{60}H_{107}Mn_4NO_{26}Sr$ |
| Molecular weight (g/mol) | 1565.84 |
| Temperature (K) | 173.15 |
| Wavelength (Å) | 0.71073 |
| Crystal system | orthogonal |
| Space group | $Pna2_1$ |
| Cell parameters | a = 19.059(3) (Å) |
|  | b = 23.711(4) (Å) |
|  | c = 19.416(4) (Å) |
|  | α = 90.00 (°) |
|  | β = 90.00 (°) |
|  | γ = 90.00 (°) |
| Volume V (Å³) | 8774(3) |
| Number of molecules in one unit cell | 4 |
| Calculated density Dc (g/cm³) | 1.185 |
| Absorption coefficient (mm⁻¹) | 1.226 |
| Single crystal size | 0.80 × 0.049 × 0.02 mm |
| F(000) | 3280 |
| range of θ | 1.371—25.499 ° |
| Number of data collected | 50841 |
| Number of independent data | 15969 [R(int) = 0.0886] |

TABLE 2-continued

| Single crystal parameters of compound 2 | |
|---|---|
| Final R factor [I > 2σ(I)] | $R_1 = 0.0891$ |
| R factor of all data | $wR_2 = 0.1880$ |
| | $R_1 = 0.1070$ |
| | $wR_2 = 0.2040$ |
| Maximum and minimum electron diffraction densities | 0.461 and $-0.666e \cdot Å^{-3}$ |

Complex 3 of the present invention has a molecular formula of $C_{119}H_{212}Mn_8N_2O_{52}Sr_2$, and a structure of $[[Mn_4SrO_4](R_1CO_2)_8(L_1)(L_2)(L_3)(L_4)] \cdot [[Mn_4SrO_4](R_1CO_2)_8(L_1)(L_2)(L_3)(L_4^*)]$, wherein $R_1$=tert-butyl, $L_1$=pyridine, $L_2$=$L_3$=$L_4$=pivalic acid, and $L_4^*$=ethyl acetate.

Complex 3 is a single crystal of monoclinic system with space group of P1 $2_1$/c1, cell parameters of a=29.9019(5) Å, b=18.9368(3) Å, c=30.1980(4) Å, α=90.00°, β=92.6590(10)°, and γ=90.00°, Z=4, and volume of 17081.1(5) Å$^3$. The crystal structure is shown in FIG. 3, and the single crystal parameters are shown in Table 3.

TABLE 3

| Single crystal parameters of complex 3 | |
|---|---|
| Molecular formula | $C_{119}H_{212}Mn_8N_2O_{52}Sr_2$ |
| Molecular weight (g/mol) | 3117.65 |
| Temperature (K) | 173.15 |
| Wavelength (Å) | 0.71073 |
| Crystal system | monoclinic |
| Space group | P1 $2_1$/c1 |
| Cell parameters | a = 29.9019(5) (Å) |
| | b = 18.9368(3) (Å) |
| | c = 30.1980(4) (Å) |
| | α = 90.00 (°) |
| | β = 92.6590(10) (°) |
| | γ = 90.00 (°) |
| Volume V (Å$^3$) | 17081.1(5) |
| Number of molecules in one unit cell | 4 |
| Calculated density Dc (g/cm$^3$) | 1.212 |
| Absorption coefficient (mm$^{-1}$) | 1.260 |
| Single crystal size | 0.21 × 0.15 × 0.09 mm |
| F(000) | 5788 |
| range of θ | 1.833—25.000°. |
| Number of data collected | 95295 |
| Number of independent data | 30027 [R(int) = 0.0563] |
| Final R factor [I > 2σ(I)] | $R_1 = 0.0547$ |
| | $wR_2 = 0.1296$ |
| R factor of all data | $R_1 = 0.0833$ |
| | $wR_2 = 0.1430$ |
| Maximum and minimum electron diffraction densities | 1.208 and $-0.824e \cdot Å^{-3}$ |

Complex 4 of the present invention has a molecular formula of $C_{132}H_{226}Mn_8N_2O_{54}Sr_2$, and a structure of $[[Mn_4SrO_4](R_1CO_2)_8(L_1)(L_2)(L_3)(L_4)] \cdot [[Mn_4SrO_4](R_1CO_2)_8(L_1)(L_2)(L_3)(L_4^*)]$, wherein $R_1$=tert-butyl, $L_1$=isoquinoline, $L_2$=$L_3$=$L_4$=pivalic acid, and $L_4^*$=ethyl acetate.

Complex 4 is a single crystal. The single crystal is a triclinic system with space group of P-1, cell parameters of a=14.676(2) Å, b=25.313(3) Å, c=25.601(4) Å, α=76.547(5)°, β=87.559(6)°, and γ=73.153(6)°, Z=2, and volume of 8850(2) Å$^3$. The crystal structure is shown in FIG. 4, and the single crystal parameters are shown in Table 4.

TABLE 4

| Single crystal parameters of complex 4 | |
|---|---|
| Molecular formula | $C_{132}H_{226}Mn_8N_2O_{54}Sr_2$ |
| Molecular weight (g/mol) | 3319.89 |
| Temperature (K) | 173.15 |
| Wavelength (Å) | 0.71073 |
| Crystal system | triclinic |
| Space group | P-1 |
| Cell parameters | a = 14.676(2) (Å) |
| | b = 25.313(3) (Å) |
| | c = 25.601(4) (Å) |
| | α = 76.547(5) (°) |
| | β = 87.559(6) (°) |
| | γ = 73.153(6) (°) |
| Volume V (Å$^3$) | 8850(2) |
| Number of molecules in one unit cell | 2 |
| Calculated density Dc (g/cm$^3$) | 1.246 |
| Absorption coefficient (mm$^{-1}$) | 1.221 |
| Single crystal size | 0.56 × 0.28 × 0.061 mm |
| F(000) | 3480 |
| range of θ | 0.864—25.2000 ° |
| Number of data collected | 72166 |
| Number of independent data | 31718 [R(int) = 0.0590] |
| Final R factor [I > 2σ(I)] | $R_1 = 0.1090$ |
| | $wR_2 = 0.2666$ |
| R factor of all data | $R_1 = 0.1263$ |
| | $wR_2 = 0.2776$ |
| Maximum and minimum electron diffraction densities | 1.243 and $-0.549e \cdot Å^{-3}$ |

In the present invention, in the synthesis method, the $[Mn_3SrO_4]$ and $[Mn_4Sr]$ cluster compounds and the cluster compounds containing $[Mn_4SrO_4]$ core structure must by synthesized in the presence of water, otherwise completely different compounds would be obtained. By comparing the structure of $[Mn_4SrO_4]$ cluster compounds with that of $[Mn_4CaO_4]$ cluster compounds, the introduction of $Sr^{2+}$ ion significantly increases the stability of the cluster compounds, and the three neutral ligands on $Sr^{2+}$ ion (only two neutral ligands on $Ca^{2+}$ ion) make the $[Mn_4SrO_4]$ cluster compounds more suitable for modification, and thus more likely to meet the needs of practical applications in the future. In addition, as Sr and Ca ions are at the core of the cluster compounds, there is no possibility that they can be interchanged without destroying the overall structure. Therefore, such cluster compounds can only be synthesized from the initial materials. The synthesis of such cluster compounds is extremely sensitive to reaction conditions, and slight changes in the reaction conditions will cause great differences in the structure and properties of the final product.

Advantageous Effects of the Present Invention

The present inventors discovered that $[Mn_3SrO_4]$ cluster compounds can be synthesized in a single step from raw materials consisting of simple and inexpensive $Mn^{2+}$, $Sr^{2+}$ inorganic compounds and carboxylic acids, by using permanganate anion as oxidant. This step can be followed by the synthesis of asymmetric biomimetic water splitting catalyst $[Mn_4SrO_4]$ cluster compounds in the presence of water. The $[Mn_4SrO_4]$ cluster compounds can catalyze the splitting of water in the presence of an oxidant to release oxygen gas.

The neutral $[Mn_3SrO_4](R_1CO_2)_6(R_1CO_2H)_3$ cluster compounds obtained in the present invention can serve as precursors for the synthesis of the biomimetic water splitting catalysts, and can be utilized in the synthesis of different types of biomimetic water splitting catalysts.

$[Mn_4SrO_4](R_1CO_2)_8(L_1)(L_2)(L_3)(L_4)$ cluster compounds can serve as artificial water splitting catalysts, can be utilized on the surface of an electrode or in the catalyzed splitting of water driven by an oxidant (which may be a stable oxidant or a photoinduced transient oxidant). No related literature on such [$Mn_3SrO_4$] cluster compounds or [$Mn_4SrO_4$] biomimetic water splitting catalysts has been reported so far.

SPECIFIC MODE FOR CARRYING OUT THE INVENTION

The present invention will be further illustrated with reference to the specific examples below. It should be understood that these examples are only used to illustrate the present invention, but are not intended to limit the scope of the present invention. In addition, it should also be understood that after reading the contents of the present invention, those skilled in the art can make various changes or modifications to the present invention, and these equivalent forms also fall within the scope defined by the present invention.

Example 1

Compound 1 [$Mn_3SrO_4$]($C_5H_9O_2$)$_6$($C_5H_9O_2H$)$_3$

The preparation method was as follows:
To a 100 ml round bottom flask were added tetrabutylammonium permanganate ($Bu''_4N.MnO_4$, 4 mmol), manganese acetate ($Mn(CH_3CO_2)_2$, 1 mmol), strontium acetate ($Sr(CH_3CO_2)_2$, 1 mmol) and pivalic acid (($CH_3)_3CCO_2H$, 40 mmol). After continuous reaction in acetonitrile at 80° C. for 25 min, the reaction was stopped. The precipitate, which was of a small amount, was removed off by filtration. The resulted brown mother liquor was allowed to stand still at 0° C. for 1-6 days and brown crystals were precipitated out. The resulted crystals were collected and dissolved in n-hexane, and dried under vacuum, with the yield of ~60% (according to the mole numbers of Sr ions).

Compound 1 has a structural formula of [$Mn_3SrO_4$] ($R_1CO_2$)$_6$($R_1CO_2H$)$_3$, wherein $R_1$=tert-butyl.

That is, compound 1 has a structural formula of [$Mn_3SrO_4$]($C_5H_9O_2$)$_6$($C_5H_9O_2H$)$_3$ and a molecular formula of $C_{45}H_{84}Mn_3O_{22}Sr$. Theoretical values of elemental analysis are: C, 43.96; H, 6.89; and experimental values are: C, 44.01; H, 6.84. Compound 1 is a single crystal of trigonal system with space group of R-3c, cell parameters of a=10.6575(15) Å, b=10.6575(15) Å, c=87.917(18) Å, α=90.00°, β=90.00°, and γ=120.00°, Z=6, and volume of 8648(3) Å$^3$.

Figure 1:
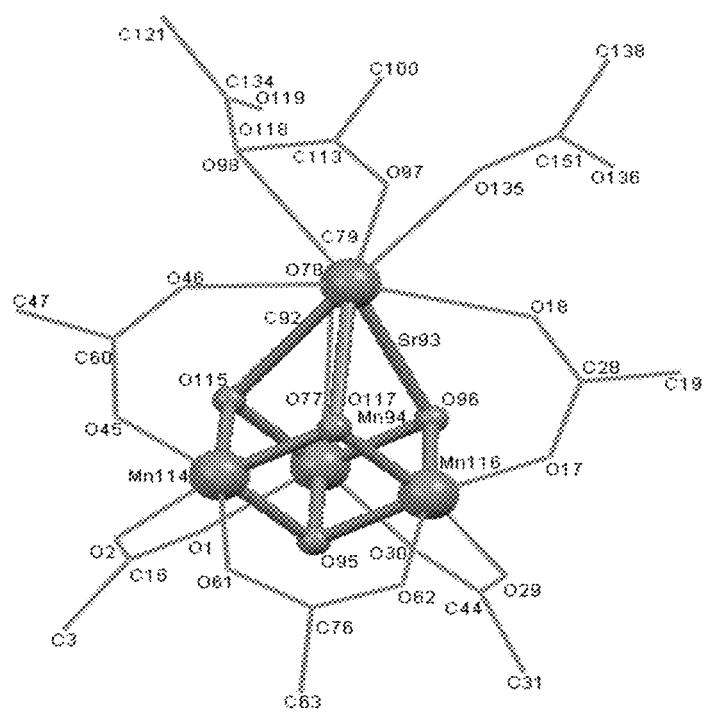
FIG. 1 shows the crystal structure of compound 1 as prepared in Example 1 of the present invention. For the sake of clarity, the hydrogen atom, the methyl of the tert-butyl and solvent molecules are all omitted.

Compound 1 has a chemical structure as shown in Formula I-1 below, determined specific single crystal parameters as shown in Table 1, and a crystal space structure as shown in FIG. 1.

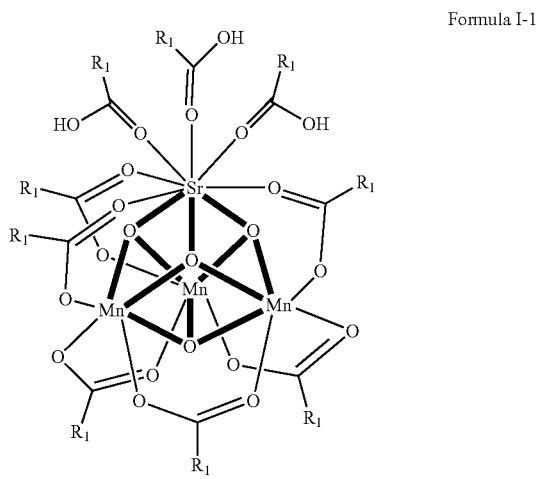

Formula I-1 wherein $R_1$=tert-butyl;

Example 2

Compound 2 [$Mn_4SrO_4$]($C_5H_9O_2$)$_8$($C_5H_9O_2H$)$_3$ ($C_5H_5N$)

The preparation method was as follows:
The first step was the synthesis of the precursor of compound 2. To a 100 ml round bottom flask were added tetrabutylammonium permanganate ($Bu''_4N.MnO_4$, 4 mmol), manganese acetate ($Mn(CH_3CO_2)_2$, 1 mmol), strontium acetate ($Sr(CH_3CO_2)_2$, 1 mmol), pivalic acid (($CH_3)_3CCO_2H$, 40 mmol) and water ($H_2O$, 1 mmol). After continuous reaction in acetonitrile at 80° C. for 25 min, the reaction was stopped. The precipitate, which was of a small amount, was removed off by filtration. The resulted brown mother liquor was allowed to stand still at 0° C. for 1-2 weeks and brown crystals were precipitated out.

The second step was the reaction with pyridine. The crystals obtained in the first step were collected and dissolved in ethyl acetate. 2% (volume ratio) of pyridine was added, and after 1-2 weeks, brown crystals were precipitated out. The resulted crystals were collected and dissolved in n-hexane. The undissolved substance, which was of a small amount, was removed off, and the solution was subject to recrystallization. After 1 week, brown crystals were precipitated out and dried under vacuum. The yield was ~12% (according to the mole numbers of $Sr^{2+}$ ions).

Compound 2 has a structural formula of $[Mn_4SrO_4](R_1CO_2)_8(L_1)(L_2)(L_3)(L_4)$, wherein $R_1$=tert-butyl, $L_1$=pyridine, and $L_2$=$L_3$=$L_4$=pivalic acid.

That is, compound 2 has a structural formula of $[Mn_4SrO_4](C_5H_9O_2)_8(C_5H_9O_2H)_3(C_5H_5N)\cdot(C_6H_{14})_{1.5}$ (note: the n-hexane is a solvent molecule), and a molecular formula of $C_{69}H_{128}Mn_4NO_{26}Sr$. Theoretical values of elemental analysis are: C, 48.89; H, 7.61; N, 0.83; and experimental values are: C, 49.00; H, 7.51; N, 0.70. Compound 2 is a single crystal of orthogonal system with space group of Pna21, cell parameters of a=19.059(3) Å, b=23.711(4) Å, c=19.416(4) Å, α=90.00°, β=90.00°, and γ=90.00°, Z=4, and volume of 8774(3) Å$^3$.

Figure 2:
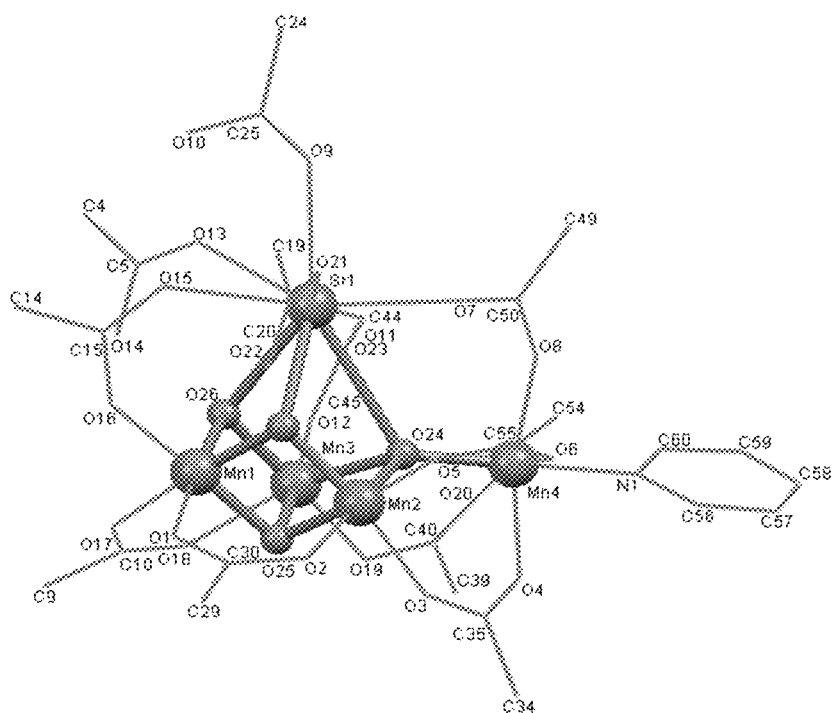
FIG. 2 shows the crystal structure of compound 2 as prepared in Example 2 of the present invention. For the sake of clarity, the hydrogen atom, the methyl of the tert-butyl and solvent molecules are all omitted.

Compound 2 has a chemical structure as shown by Formula II-1 below, determined specific single crystal parameters as shown in Table 2, and a crystal space structure as shown in FIG. 2.

Formula II-1

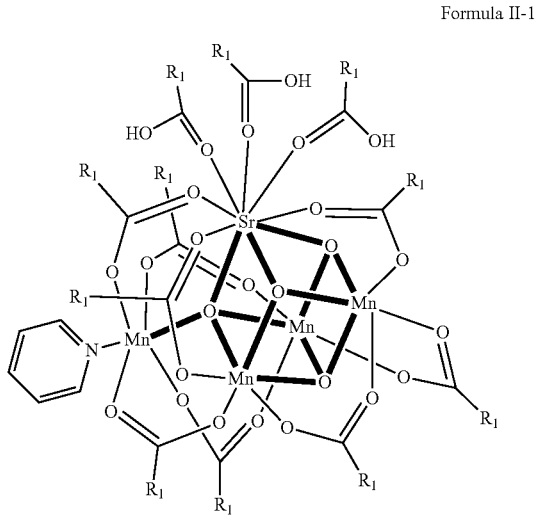

wherein $R_1$=tert-butyl;

Example 3

Complex 3 $[[Mn_4SrO_4](C_5H_9O_2)_8(C_5H_5N)_1(C_5H_9O_2H)_3]\cdot[[Mn_4SrO_4](C_5H_9O_2)_8(C_5H_5N)_1(C_5H_9O_2H)_2(C_2H_5O_2CCH_3)_1]$ The preparation method was as follows:

0.100 g compound 2 was weighed and dissolved in ethyl acetate. The mixture was allowed to stand still at room temperature for 1-3 weeks and slender brown crystals were precipitated out. The crystals were rinsed with cyclohexane and then vacuum dried. The yield was ~70% (according to the mole numbers of $Sr^{2+}$ ions).

Complex 3 has a structural formula of $[[Mn_4SrO_4](R_1CO_2)_8](L_1)(L_2)(L_3)(L_4)]\cdot[[Mn_4SrO_4](R_1CO_2)_8](L_1)(L_2)(L_3)(L_4^*)]$, wherein $R_1$=tert-butyl, $L_1$=pyridine, $L_2$=$L_3$=$L_4$=pivalic acid, and $L_4^*$=ethyl acetate.

Figure 3:
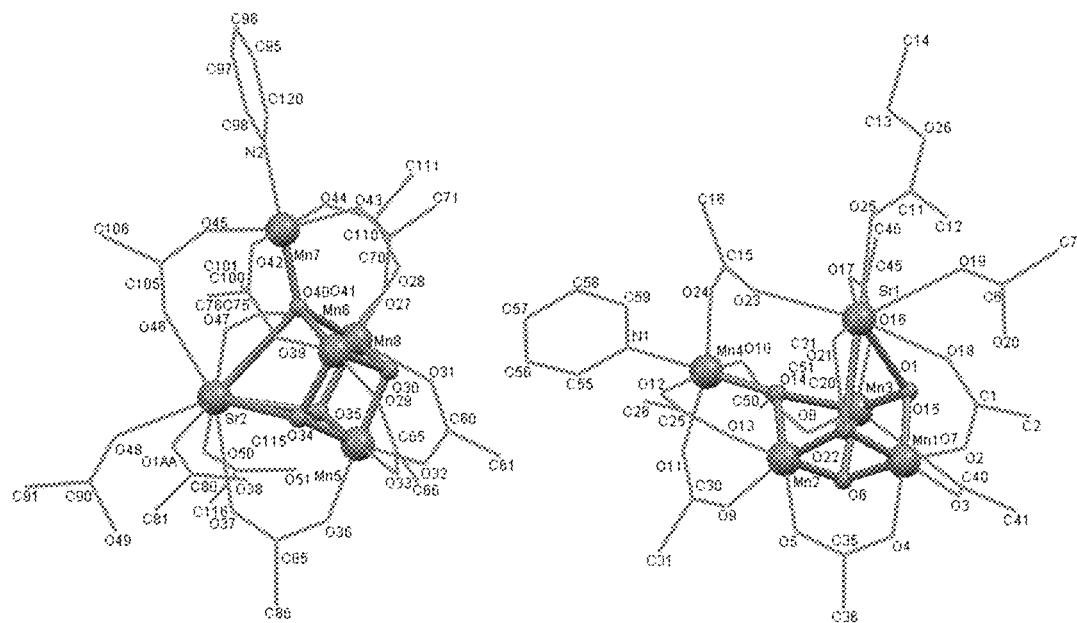
FIG. 3 shows the crystal structure of complex 3 as prepared in Example 3 of the present invention. For the sake of clarity, the hydrogen atom, the methyl of the tert-butyl and solvent molecules are all omitted. There are two [$Mn_4SrO_4$] cluster compounds in the figure, and they differ in that one neutral pivalic acid molecule on the strontium ion is replaced by one ethyl acetate molecule.

That is, complex 3 has a structural formula of $[[Mn_4SrO_4](C_5H_9O_2)_8(C_5H_5N)_1(C_5H_9O_2H)_3]\cdot[[Mn_4SrO_4](C_5H_9O_2)_8(C_5H_5N)_1(C_5H_9O_2H)_2(C_2H_5O_2CCH_3)_1]$, and a molecular formula of $C_{119}H_{212}Mn_8N_2O_{52}Sr_2$. Theoretical values of elemental analysis are: C, 45.84; H, 6.85; N, 0.90; and experimental values are: C, 45.82; H, 6.81; N, 1.21. Complex 3 is a single crystal of monoclinic system with space group of P1 2$_1$/c1, cell parameters of a=29.9019(5) Å, b=18.9368(3) Å, c=30.1980(4) Å, α=90.00°, β=92.6590(10)°, and γ=90.00°, Z=4, and volume of 17081.1(5) Å$^3$. Complex 3 has a chemical structure of $[[Mn_4SrO_4](C_5H_9O_2)_8(C_5H_5N)_1(C_5H_9O_2H)_2(C_2H_5O_2CCH_3)_1]$ as shown by Formula II-2 below, determined specific single crystal parameters as shown in Table 3, and a crystal space structure as shown in FIG. 3.

Formula II-2

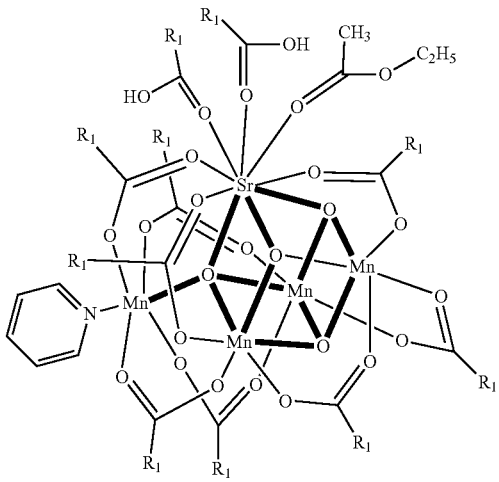

wherein $R_1$=tert-butyl;

Example 4

Complex 4 $[[Mn_4SrO_4](C_5H_9O_2)_8(C_9H_7N)_1(C_5H_9O_2H)_3]\cdot[[Mn_4SrO_4](C_5H_9O_2)_8(C_9H_7N)_1(C_5H_9O_2H)_2(C_2H_5O_2CCH_3)_1]$ The preparation method was as follows:

The first step was the synthesis of the precursor of complex 4. To a 100 ml round bottom flask were added tetrabutylammonium permanganate ($Bu^n_4N\cdot MnO_4$, 4 mmol), manganese acetate ($Mn(CH_3CO_2)_2$, 1 mmol), strontium acetate ($Sr(CH_3CO_2)_2$, 1 mmol) and pivalic acid ($(CH_3)_3CCO_2H$, 40 mmol). After continuous reaction in acetonitrile at 80° C. for 25 min, the reaction was stopped. The precipitate, which was of a small amount, was removed off by filtration. The resulted brown mother liquor was allowed to stand still at 0° C. for 1-2 weeks and brown crystals were precipitated out.

The second step was the reaction with isoquinoline. The crystals obtained in the first step were collected and dissolved in ethyl acetate. 1% (volume ratio) isoquinoline was added for recrystallization. After 1-2 weeks, black crystals were collected, rinsed with cyclohexane and vacuum dried. The yield was ~40% (according to the mole numbers of $Sr^{2+}$ ions).

Complex 4 has a structural formula of $[[Mn_4SrO_4](R_1CO_2)_8(L_1)(L_2)(L_3)(L_4)]\cdot[[Mn_4SrO_4](R_1CO_2)_8(L_1)(L_2)(L_3)(L_4^*)]$, wherein $R_1$=tert-butyl, $L_1$=isoquinoline, $L_2$=$L_3$=$L_4$=pivalic acid, and $L_4^*$=ethyl acetate.

That is, complex 4 has a structural formula of $[[Mn_4SrO_4](C_5H_9O_2)_8(C_9H_7N)_1(C_5H_9O_2H)_3]\cdot[[Mn_4SrO_4](C_5H_9O_2)_8(C_9H_7N)_1(C_5H_9O_2H)_2(C_2H_5O_2CCH_3)_1]$, and a molecular formula of $C_{132}H_{226}Mn_8N_2O_{54}Sr_2$. Complex 4 is a single crystal of triclinic system with space group of P-1, cell parameters of a=14.676(2) Å, b=25.313(3) Å, c=25.601(4) Å, α=76.547(5)°, β=87.559(6)°, and γ=73.153(6)°, Z=2, and volume of 8850(2) Å³.

Figure 4:
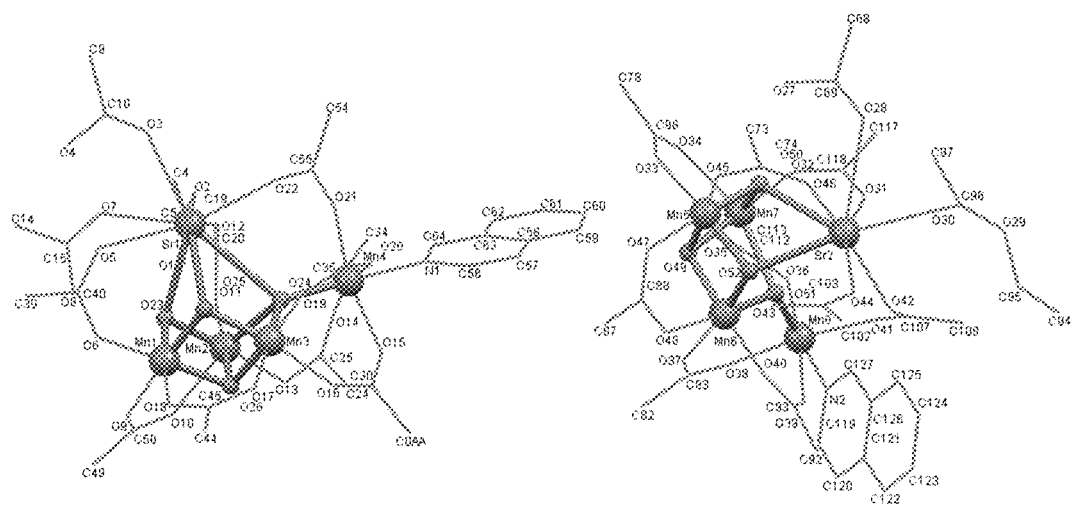
FIG. 4 shows the crystal structure of complex 4 as prepared in Example 4 of the present invention. For the sake of clarity, the hydrogen atom, the methyl of the tert-butyl and solvent molecules are all omitted. There are two [$Mn_4SrO_4$] cluster compounds in the figure, and they differ in that one neutral pivalic acid molecule on the strontium ion is replaced by one ethyl acetate molecule.

Complex 4 has a chemical structure as shown by Formulas II-3-1 and II-3-2 below, determined specific single crystal parameters as shown in Table 4, and a crystal space structure as shown in FIG. 4.

Formula II-3-1

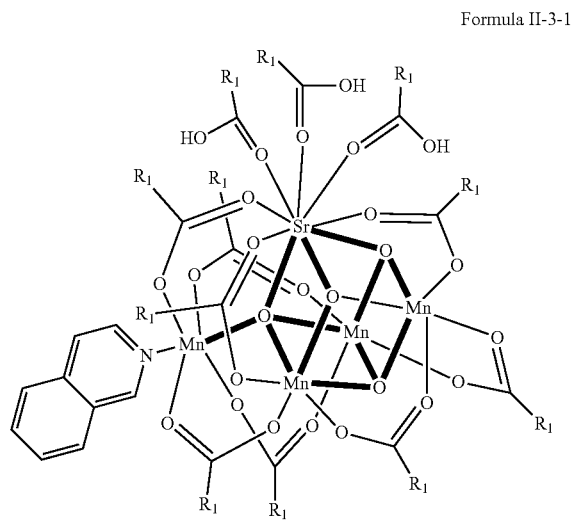

wherein $R_1$=tert-butyl;

Formula II-3-2

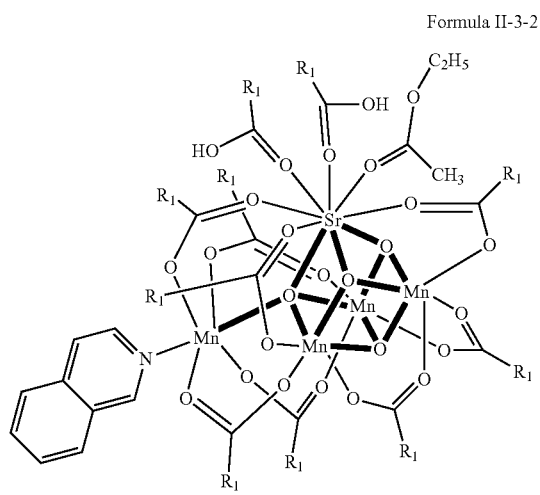

wherein $R_1$=tert-butyl;

Example 5

Trace of the UV-Vis Spectrum of the Interaction Between Compound 2 and Water

Figure 5:
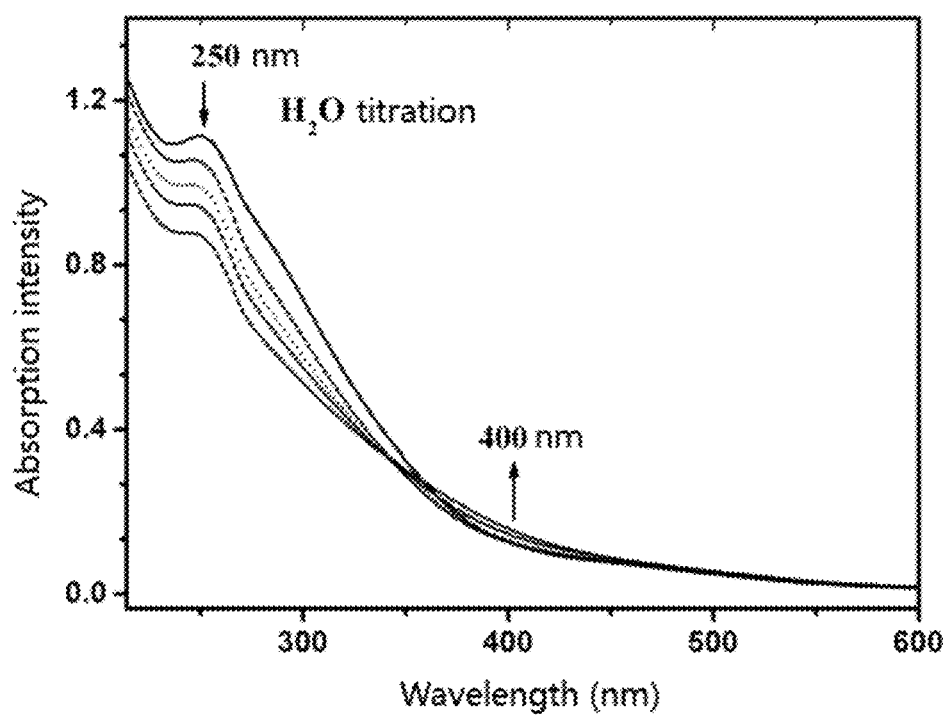
FIG. 5 shows the trace of the change in UV-Vis absorption spectrum of the interaction between compound 2 and water in Example 5 of the present invention.

To a colorimetric cell was added 1 mL solution of 25 μM compound 2 in acetonitrile. Using 1 mL pure acetonitrile as reference, the absorption spectrum was determined in Hitachi U-3900 spectrophotometer type UV-Vis spectrometer (see FIG. 5). This compound had the maximum absorption at 250 nm. With the addition of water (0%, 0.15%, 0.35%, 0.55% and 1.05% water was added respectively), the absorption spectrum changed significantly. Specifically, the absorption at 250 nm decreased significantly, while the absorption at 400 nm increased, indicating that water molecules interacted with compound 2. As compared with [Mn₄CaO₄] cluster compounds, the sensitivity of [Mn₄SrO₄] cluster compounds to water was significantly reduced. The absorption peak of [Mn₄SrO₄] cluster compound at 250 nm was only reduced by 20% when there existed 1% water, whereas the absorption peak of the corresponding [Mn₄CaO₄] cluster compound at 250 nm was reduced by more than 60% when there existed 1% water, indicating that a small amount of water has little effect on the spectrum of [Mn₄SrO₄] but has a greater effect on the spectrum of [Mn₄CaO₄] cluster compounds. [Mn₄CaO₄] cluster compounds belongs to water extremely sensitive substances, and the sensitivity leads to reduced stability and therefore limited the application thereof. To the contrary, the [Mn₄SrO₄] cluster compounds newly synthesized and discovered in the present invention were much more stable than [Mn₄CaO₄] cluster compounds and had a wide application prospect as water splitting catalyst.

Example 6

Figure 6:
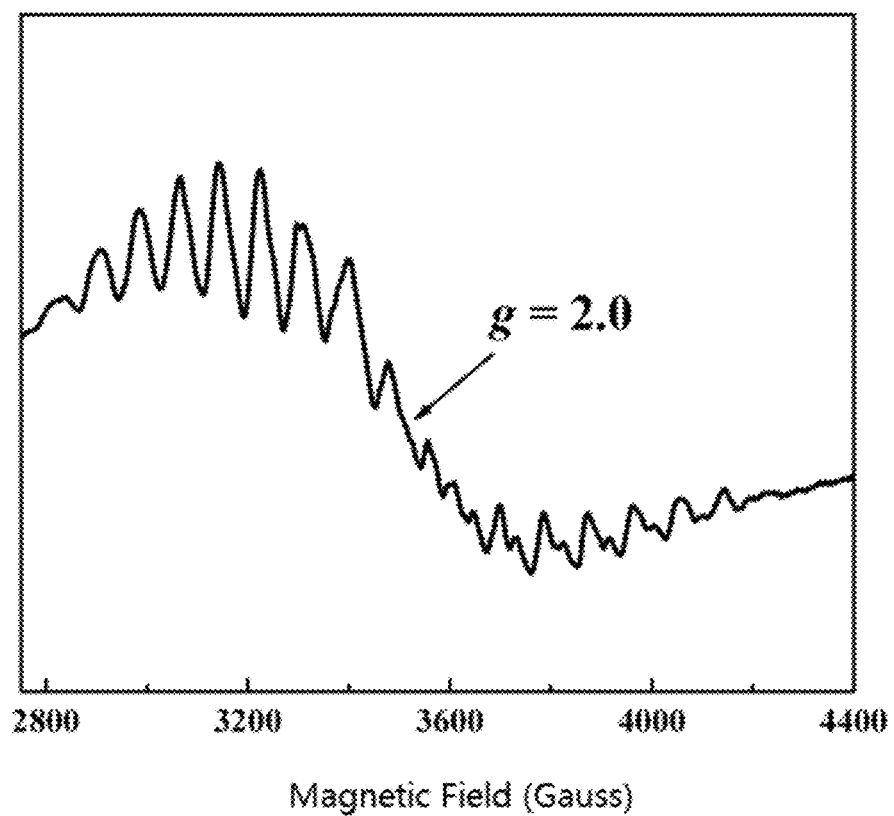
FIG. 6 shows the electron paramagnetic signal produced after the oxidization of compound 2 in Example 6 of the present invention. The data supports that the four Mn ions of compound 2 in ground state have valence states of +3, +3, +4 and +4, respectively.

Electron Paramagnetic Resonance of Compound 2 for Detecting the Valence State of Mn Ions in the Compound Compound 2 (1 mM) was dissolved in dichloroethane, and then 0.5 mM oxidant [Fe(Phen)₃](PF₆)₃ (wherein Phen=phenanthroline) was added. The mixture was then rapidly frozen to 77K and the electron paramagnetic signals were detected with Bruker E500 electron paramagnetic resonance instrument at 7K (see FIG. 6). The multiple peak paramagnetic signal at g=2.0 was clearly seen. The occurrence of this signal indicated that after oxidization of the compound, the valence states of the four manganese ions were +3, +4, +4 and +4, respectively. Thus it could be inferred that the valence states of the four Mn ions in the ground state (i.e., the stable state before oxidation) of the compound were +3, +3, +4 and +4, respectively.

Experimental Example 7

Figure 7:
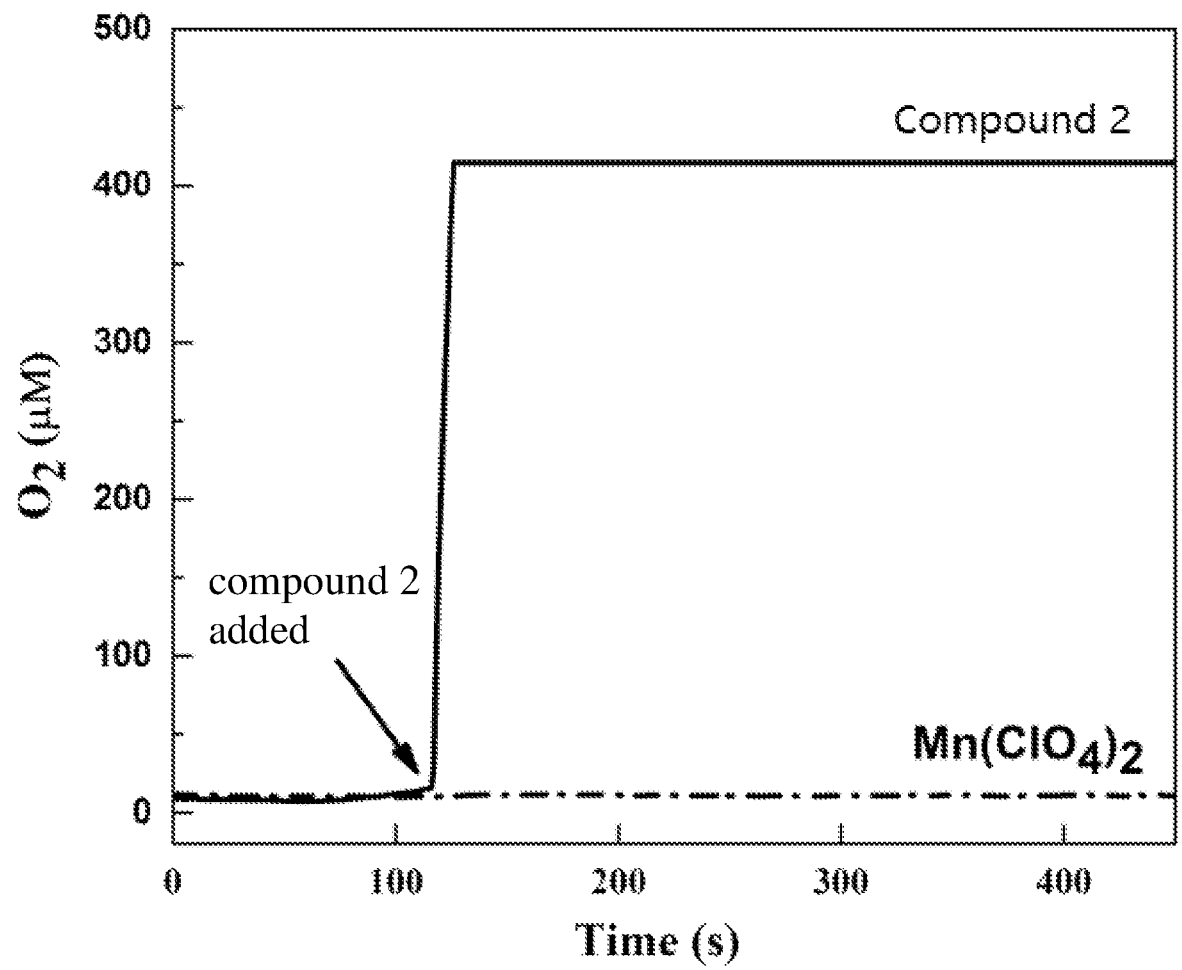
FIG. 7 shows the determination of the oxygen released during the spliting of water catalyzed by compound 2 in the presence of oxidant in Example 7 of the present invention.

Determination of the Oxygen Released During the Water Splitting Catalyzed by Compound 2 in the Presence of an Oxidant The activity of releasing oxygen during the catalytic water splitting was determined on a Clark-type oxygen electrode (FIG. 7). A rapid release of oxygen to saturation was observed with the addition of 500 μM of compound 2 to an aqueous solution containing an oxidant (hydrogen peroxide, 0.1 M), whereas no visible release of oxygen was observed with the addition of the reference compound (Mn(ClO₄)₂). The arrow in the figure showed the loading position of the sample. FIG. 7 indicated that compound 2 had catalytic activity of catalyzing the splitting of water to release oxygen.

The embodiments of the present invention have been described above. However, this invention is not limited to the above embodiments. Any modification, equivalent replacement, or improvement made within the spirit and principle of the present invention shall be included in the protection scope of the present invention.

The invention claimed is:
1. A compound $[Mn_4SrO_4](R_1CO_2)_8(L_1)(L_2)(L_3)(L_4)$ of Formula II

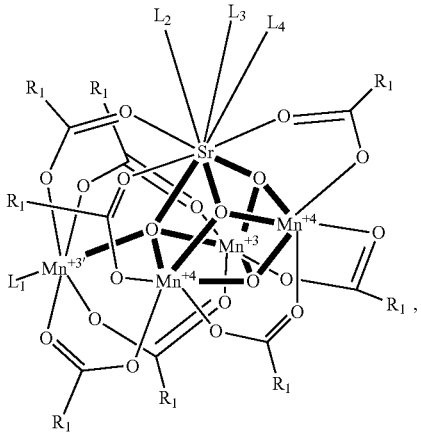

wherein $R_1$ is H, a $C_{1-8}$ linear alkyl, or a $C_{1-8}$ branched alkyl;
the four ligands $L_1$, $L_2$, $L_3$ and $L_4$ are the same or different and are each selected from carboxylic acid molecules, pyridine, imidazole, pyrazine, quinoline, isoquinoline, bipyridine, $H_2O$, alcohol molecules, ketones, nitriles, and esters.

2. A complex comprising two or more compounds $[Mn_4SrO_4](R_1CO_2)_8(L_1)(L_2)(L_3)(L_4)$ of Formula II

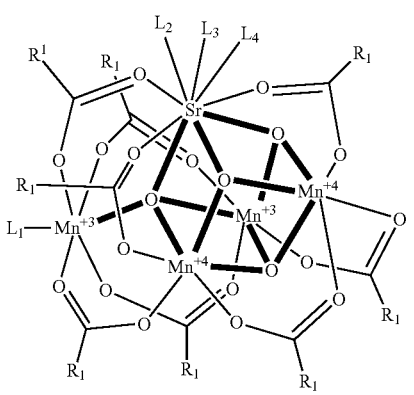

wherein $R_1$ is H, a $C_{1-8}$ linear alkyl, or a $C_{1-8}$ branched alkyl;
the four ligands $L_1$, $L_2$, $L_3$ and $L_4$ are the same or different and are each selected from carboxylic acid molecules, pyridine, imidazole, pyrazine, quinoline, isoquinoline, bipyridine, $H_2O$, alcohol molecules, ketones, nitriles, and esters.

3. A method for preparing the $[Mn_4SrO_4](R_1CO_2)_8(L_1)(L_2)(L_3)(L_4)$ compound of claim 1, comprises the following steps:
Step 1: dissolving an acid, an oxidant, a $Mn^{2+}$ salt, a $Sr^{2+}$ salt, and optionally water an acetonitrile solvent to obtain a solution;
filtering the solution to obtain a filtrate; and
crystallizing the filtrate to obtain crystals;
Step 2: dissolving the crystals obtained from Step 1 in an ester solvent; and
adding $L_1$, $L_2$, $L_3$ and $L_4$ to the ester solvent to cause recrystallization to obtain the $[Mn_4SrO_4](R_1CO_2)_8(L_1)(L_2)(L_3)(L_4)$ compound, wherein the molar ratio of the acid, the oxidant, the $Mn^{2+}$ salt, the $Sr^{2+}$ salt, and the optional water is (10-120):(1-10):1:1:(0-20).

4. A method for preparing the complex according to claim 2, comprising the following steps:
Step 1: dissolving an acid, an oxidant, a $Mn^{2+}$ salt, a $Sr^{2+}$ salt, and optional in an acetonitrile solvent to obtain a solution;
filtering the solution to obtain a filtrate; and
crystallizing the filtrate to obtain crystals; and
Step 2: dissolving the crystals obtained from Step 1 in an ester solvent; and adding $L_1$, $L_2$, $L_3$ and $L_4$ to the ester solvent to cause recrystallization to obtained the complex of claim 3; and
Step 3: optionally, dissolving the product obtained from Step 2 in an ester solution, and then subject to rinsing or recrystallization with an alkane, a cycloalkane, or a halogenated hydrocarbon,
wherein the molar ratio of the acid, the oxidant, the $Mn^{2+}$ salt, the $Sr^{2+}$ salt, and the optional water is (10-120):(1-10):1:1:(0-20).

5. A method for biomimetic water splitting, comprising:
adding the $[Mn_4SrO_4](R_1CO_2)_8(L_1)(L_2)(L_3)(L_4)$ compound of claim 1 and an oxidant; and
causing water to split and release oxygen.

6. A method for biomimetic water splitting, comprising:
adding the complex according to claim 2 and an oxidant into water; and
causing water to split and release oxygen.

7. A water splitting catalyst, comprising the $[Mn_4SrO_4](R_1CO_2)_8(L_1)(L_2)(L_3)(L_4)$ compound according to claim 2.

8. A water splitting catalyst, comprising the complex according to claim 2.

9. The compound according to claim 1, the carboxylate anion $(R_1CO_2)$ is selected from formic acid, acetic acid, propionic acid, butyric acid, isobutyric acid, valeric acid, isovaleric acid, pivalic acid, and hexanoic acid.

10. The compound according to claim 1, the compound of Formula II is
$[Mn_4SrO_4](R_1CO_2)_8(L_1)(L_2)(L_3)(L_4)$, wherein $R_1$ is tert-butyl, $L_1$ is pyridine, and $L_2$, $L_3$, and $L_4$ are pivalic acid.

11. The compound according to claim 10 is of a single crystal of orthogonal system with space group of Pna21, cell parameters of a=19.059(3) Å, b=23.711(4) Å, c=19.416(4) Å, $\alpha$=90.00°, $\beta$=90.00°, and $\gamma$=90.00°, Z=4, and volume of 8774(3) Å$^3$, has a structural formula of Formula II-1:

Formula II-1

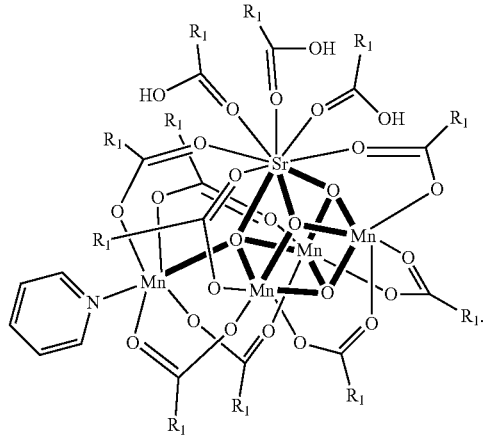

12. The complex according to claim 2 is
[[Mn$_4$SrO$_4$](R$_1$CO$_2$)$_8$(L$_1$)(L$_2$)(L$_3$)(L$_4$)].[[Mn$_4$SrO$_4$](R$_1$CO$_2$)$_8$(L$_1$)(L$_2$)(L$_3$)(L$_4$*)], wherein R$_1$ is tert-butyl, L$_1$ is pyridine or isoquinoline, L$_2$, L$_3$, and L$_4$ are pivalic acid, and L$_4$* is ethyl acetate.

13. The compound according to claim 2 is complex 3 or complex 4, wherein:

complex 3 is [[Mn$_4$SrO$_4$](R$_1$CO$_2$)$_8$(L$_1$)(L$_2$)(L$_3$)(L$_4$).[[Mn$_4$SrO$_4$](R$_1$CO$_2$)$_8$(L$_1$)(L$_2$)(L$_3$)(L$_4$*)], wherein R$_1$ is tert-butyl, L$_1$ is pyridine, L$_2$, L$_3$, and L$_4$ are pivalic acid, and L$_4$* is ethyl acetate, and has a single crystal of monoclinic system with space group of P1 2$_1$/c1, and cell parameters of a=29.9019(5) Å, b=18.9368(3) Å, c=30.1980(4) Å, α=90.00°, β=92.6590(10) °, and γ=90.00°, Z=4, and volume of 17081.1(5) Å$^3$, and

[[Mn$_4$SrO$_4$](R$_1$CO$_2$)$_8$(L$_1$)(L$_2$)(L$_3$)(L$_4$)] in complex 3 is of Formula II-1, and

[[Mn$_4$SrO$_4$](R$_1$CO$_2$)$_8$(L$_1$)(L$_2$)(L$_3$)(L$_4$*)] in complex 3 is of Formula 11-2:

Formula II-2

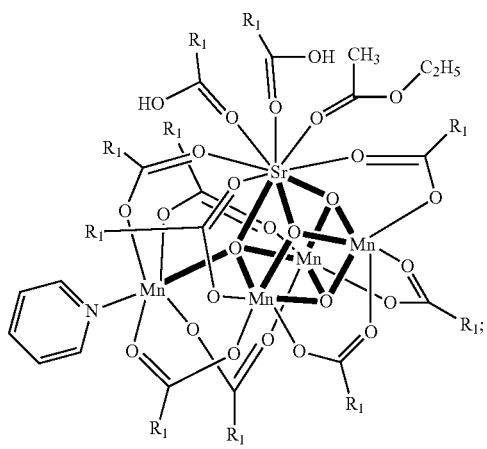

and complex 4 is [[Mn$_4$SrO$_4$](R$_1$CO$_2$)$_8$(L$_1$)(L$_2$)(L$_3$)(L$_4$)].[[Mn$_4$SrO$_4$](R$_1$CO$_2$)$_8$(L$_1$)(L$_2$)(L$_3$)(L$_4$*)], wherein R$_1$ is tert-butyl, L$_1$ is isoquinoline, L$_2$, L$_3$, and L$_4$ are pivalic acid, and L$_4$* is ethyl acetate, has a single crystal of triclinic system with space group of P-1, and cell parameters of a=14.676(2) Å, b=25.313(3) Å, c=25.601(4) Å, α=76.547(5)°, β=87.559(6)°, and γ=73.153(6)°, Z=2, and volume of 8850(2) Å$^3$, and

[[Mn$_4$SrO$_4$](R$_1$CO$_2$)$_8$(L$_1$)(L$_2$)(L$_3$)(L$_4$)] in complex 4 has a structural formula of Formula II-3-1, and the [[Mn$_4$SrO$_4$](R$_1$CO$_2$)$_8$(L$_1$)(L$_2$)(L$_3$)(L$_4$*)] in complex 4 has a structural formula of Formula 11-3-2:

Formula II-3-1

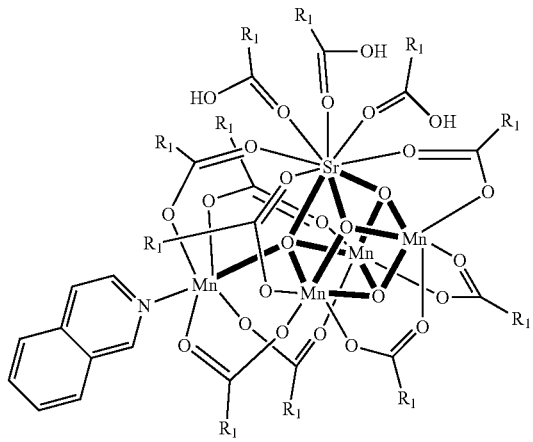

Formula II-3-2

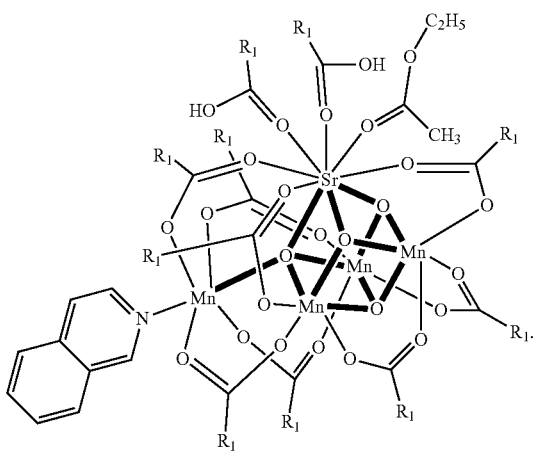

14. The method according to claim 3, wherein:
the Mn$^{2+}$ salt is one or more selected from carboxylic acid salts of Mn$^{2+}$, Mn(ClO$_4$)$_2$, MnCl$_2$, MnSO$_4$, Mn(NO$_3$)$_2$, and Mn(CF$_3$SO$_3$)$_2$, Mn(ClO$_4$)$_2$(H$_2$O)$_n$, MnSO$_4$(H$_2$O)$_n$, Mn(NO$_3$)$_2$(H$_2$O)$_n$, Mn(CF$_3$SO$_3$)$_2$(H$_2$O)$_n$, and mixtures thereof, wherein n=1-5, and the carboxylate anion (R$_1$CO$_2^-$) in the carboxylic acid salts is one or more selected from formate, acetate, propionate, butyrate, isobutyrate, valerate, isovalerate, pivalate, and hexanoate;

the Sr$^{2+}$ salt is one or more selected from carboxylic acid salts of strontium, Sr(ClO$_4$)$_2$, Sr(NO$_3$)$_2$, Sr(CF$_3$SO$_3$)$_2$, Sr(ClO$_4$)$_2$(H$_2$O)$_n$, Sr(NO$_3$)$_2$(H$_2$O)$_n$, Sr(CF$_3$SO$_3$)$_2$(H$_2$O)$_n$, and mixtures thereof, wherein n=1-5 and the carboxylic anion (R$_1$CO$_2^-$) in the carboxylic salts of strontium is one or more selected from formate, acetate, propionate, butyrate, isobutyrate, valerate, isovalerate, pivalate, and hexanoate;

the oxidant is permanganate anionic oxidant; and
the acid is formic acid, acetic acid, propionic acid, butyric acid, isobutyric acid, valeric acid, isovaleric acid, pivalic acid, or hexanoic acid.

15. The method according to claim 3, wherein the volume of the acetonitrile solvent in Step 1 is about 60-100 mL acetonitrile per mmol strontium salt, and the ester solvent used in Step 2 is ethyl acetate, methyl acetate, propyl propionate, n-hexane, isooctane, dichloroethane, or dichloromethane.

16. The method according to claim 4, wherein:

the $Mn^{2+}$ salt is one or more selected from carboxylic acid salts of $Mn^{2+}$, $Mn(ClO_4)_2$, $MnCl_2$, $MnSO_4$, $Mn(NO_3)_2$, and $Mn(CF_3SO_3)_2$, $Mn(ClO_4)_2(H_2O)_n$, $MnSO_4(H_2O)_n$, $Mn(NO_3)_2(H_2O)_n$, and $Mn(CF_3SO_3)_2(H_2O)_n$, wherein n=1-5; wherein the carboxylic acid anion ($R_1CO_2^-$) in the carboxylic acid salts of $Mn^{2+}$ is one or more selected from formate, acetate, propionate, butyrate, isobutyrate, valerate, isovalerate, pivalate, and hexanoate;

the $Sr^{2+}$ salt is one or more selected from carboxylic acid salts of strontium, $Sr(ClO_4)_2$, $Sr(NO_3)_2$, $Sr(CF_3SO_3)_2$, $Sr(ClO_4)_2(H_2O)_n$, $Sr(NO_3)_2(H_2O)_n$, $Sr(CF_3SO_3)_2(H_2O)_n$, wherein n=1-5, and the carboxylic acid anion ($R_1CO_2^-$) in the carboxylic acid salts of strontium is formate, acetate, propionate, butyrate, isobutyrate, valerate, isovalerate, pivalate, and hexanoate;

the oxidant is an permanganate anionic oxidant; and the acid is formic acid, acetic acid, propionic acid, butyric acid, isobutyric acid, valeric acid, isovaleric acid, pivalic acid, or hexanoic acid.

17. The method according to claim 4, wherein:

the volume of the acetonitrile solvent in Step 1 is about 60-100 mL acetonitrile per mmol strontium salt; and the ester solvent in Step 2 is ethyl acetate, methyl acetate, propyl propionate, n-hexane, isooctane, dichloroethane, or dichloromethane.

* * * * *